United States Patent [19]

Warren

[11] 4,319,247
[45] Mar. 9, 1982

[54] TARGET DETECTING APPARATUS EQUIPPED WITH TESTING DEVICE FOR SIMULATING TARGETS AT DIFFERENT RANGES

[75] Inventor: Kenneth A. J. Warren, Great Baddow, England

[73] Assignee: The Marconi Company Limited, Chelmsford, England

[21] Appl. No.: 88,061

[22] Filed: Oct. 24, 1979

[30] Foreign Application Priority Data

Nov. 22, 1978 [GB] United Kingdom ............ 45572/78

[51] Int. Cl.³ ............................................ G01S 7/40
[52] U.S. Cl. .................................................. 343/17.7
[58] Field of Search ........................................ 343/17.7

[56] References Cited

U.S. PATENT DOCUMENTS

| | | | |
|---|---|---|---|
| 2,532,539 | 12/1950 | Counter et al. | 343/17.7 X |
| 3,018,478 | 1/1962 | Skillman et al. | 343/17.7 |
| 3,199,107 | 8/1965 | Mills | 343/17.7 |
| 3,331,070 | 7/1967 | Sommers et al. | 343/17.7 |
| 3,365,719 | 1/1968 | Williams | 343/17.7 |
| 4,121,213 | 10/1978 | Bush et al. | 343/17.7 |
| 4,145,692 | 3/1979 | Armstrong et al. | 343/17.7 |

FOREIGN PATENT DOCUMENTS 593539 10/1947 United Kingdom ............ 343/17.7
1386285 3/1975 United Kingdom .

*Primary Examiner*—T. H. Tubbesing
*Attorney, Agent, or Firm*—Spencer & Kaye

[57] ABSTRACT

When existing radar systems fail to detect a target the operator may be unsure whether this is because of some failure in the apparatus or because there is in fact no target there.

The invention deals with this problem by providing a testing device for simulating targets at different ranges. The testing device includes a small aerial arranged to sample a transmitted pulse. This sample is fed to a circuit which imposes successive delays on the sample and feeds it back to the aerial at successive different times.

The successive delays are produced by a delay line and a feed-back loop containing an amplifier. The circuit also includes a frequency shifter which simulates a Doppler shift.

5 Claims, 2 Drawing Figures

TARGET DETECTING APPARATUS EQUIPPED WITH TESTING DEVICE FOR SIMULATING TARGETS AT DIFFERENT RANGES

BACKGROUND OF THE INVENTION

This invention relates to apparatus for detecting objects of interest and is particularly, though not exclusively, applicable to radar systems for detecting moving targets and for indicating their range.

In the use of radar systems such as referred to above, situations often arise when there is no target, to which the radar is responsive, within the range of the system. It is therefore desirable for the operator to have some facility by which he can check that the radar is functioning correctly and will detect targets at any range within the limits of the system.

BRIEF SUMMARY OF THE INVENTION

An object of this invention is to provide a radar or other similar apparatus with a facility for simulating objects at different distances so that the operator can determine whether the transmitting and receiving parts of his apparatus are functioning correctly.

This invention provides apparatus for detecting a target comprising a transmitter for transmitting a signal to the target and a receiver for receiving the signal after reflection from the target, characterised by a testing device for simulating targets at different ranges, the testing device including means for taking a sample of the signal and means for transmitting the sample to the receiver at least twice.

The testing device preferably comprises a delay line connected to receive the sample and a feed-back connection for feeding the sample at least a second time through the delay line. The sample can thus be transmitted back to the receiver at two different times: after it has passed through the delay line once and twice respectively. It is of course possible to arrange for the sample to be passed through the delay line any required number of times greater than two and for it to be transmitted to the receiver after each passage through the delay line.

The feed-back connection preferably includes an amplifier. The gain of this amplifier and the attenuation caused by the delay line are preferably such that the amplitude of the sample, after passing once through the delay line, is different from the amplitude after passing the next time through the delay line. In this way the amplitude of the sample transmitted back to the receiver after one passage through the delay line is different from that after the next passage through the delay line. This enables the testing device to test the apparatus over a range of strengths of echo signal. In a preferred arrangement the delay caused by the delay line is such that the sample is transmitted to the receiver two or more times before the transmitter transmits another signal, the transmissions of the sample being at progressively decreasing amplitudes so that they decay to an undetectable level by the time that the next signal is transmitted. The delay line may be an acoustic delay line and is preferably, on economic grounds, quartz crystal. Where, as will normally be the case, the invention is applied to a radar system, the testing device preferably includes a second aerial for sampling the signal after the latter has been transmitted by a main transmitting aerial of the system. The second aerial can conveniently be used also for re-transmitting the sample, after each delay period back to the main aerial.

When the apparatus is such that it detects only moving targets, these being distinguished by the frequency change caused by Doppler effect, it is necessary for the testing device to include a frequency shifter which changes the frequency of the sample so as to simulate the Doppler effect.

DETAILED DESCRIPTION

Figure 1:
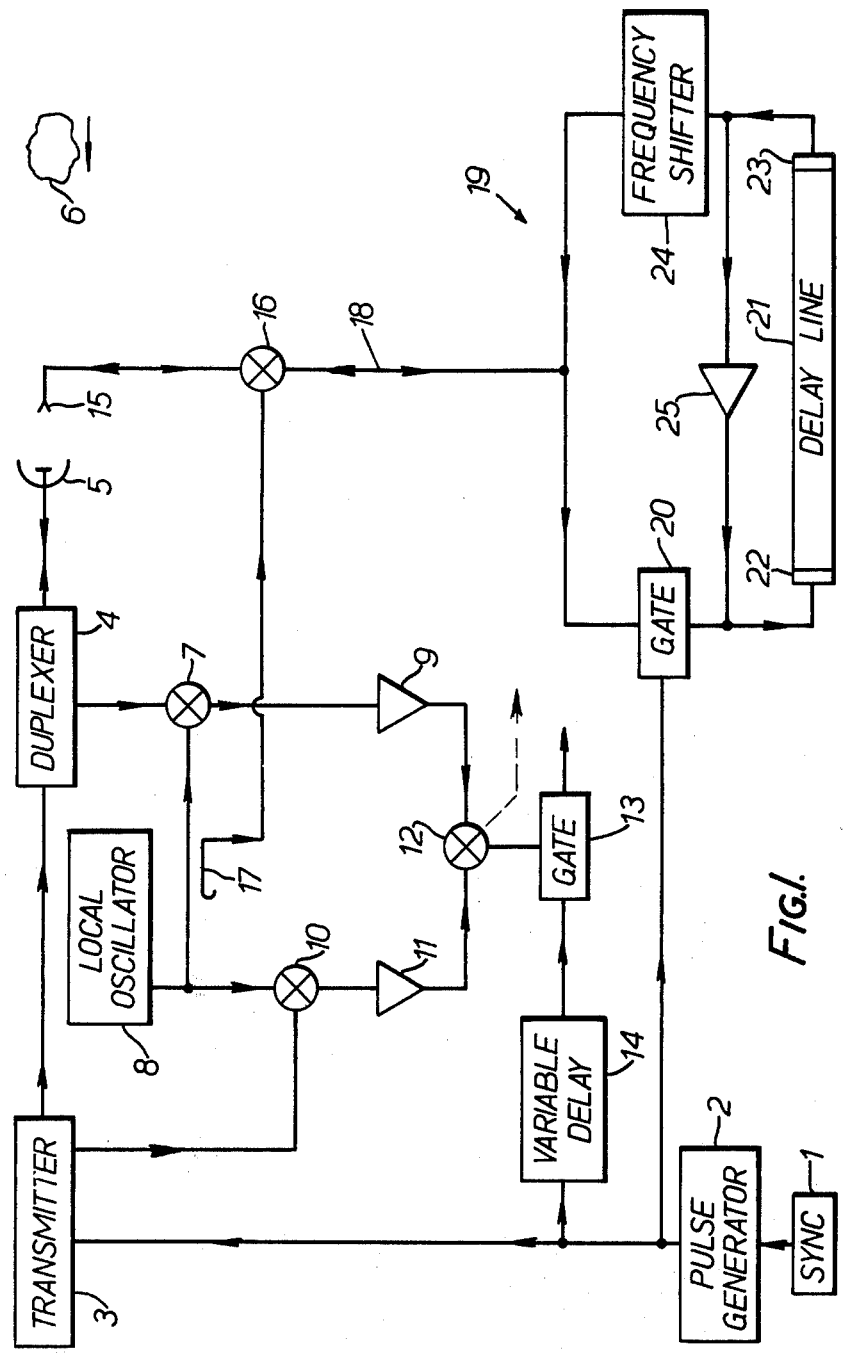
FIG. 1 is a block diagram of a radar system embodying the invention.
Figure 2:
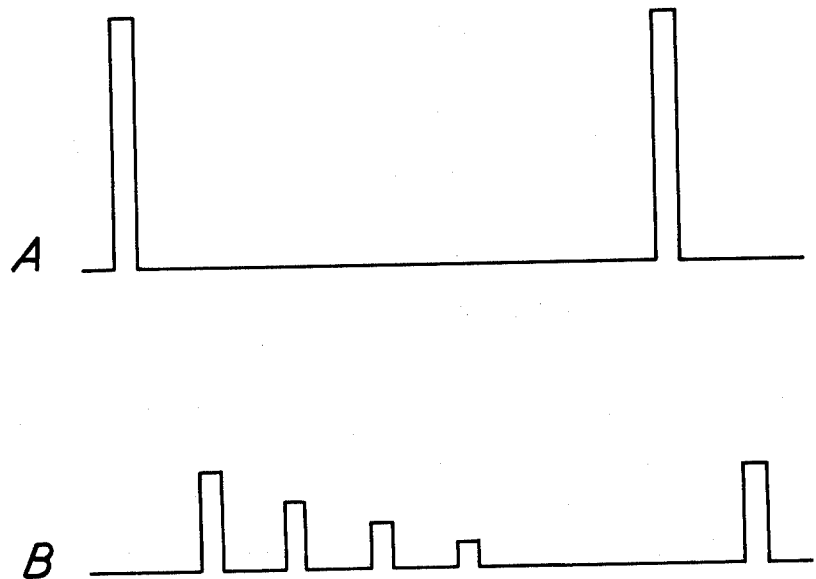
FIG. 2 shows at A and B respectively pulse diagrams of the transmitted pulses and of simulated echo pulses.

Referring firstly to FIG. 1, the apparatus operates as follows. A synchronising signal generator 1 produces synchronising signals at a fixed pulse repetition frequency. These synchronising signals are fed to a pulse generator 2 which produces a pulse of a particular duration for each synchronising signal received. The pulses produced at 2 are fed to a transmitter 3 which, for the duration of each pulse, produces an output signal of, in this particular embodiment, 7,000 megahertz. The pulse output from the transmitter is fed through a duplexer 4 to a combined transmitting and receiving aerial 5. The transmitted pulses are shown at A on FIG. 2 where the horizontal ordinate denotes time and the vertical ordinate denotes amplitude. It will be understood of course that each of the pulses shown at A on FIG. 2 is merely the envelope of the 7,000 megahertz waveform.

The pulses shown at A are transmitted through the atmosphere from the aerial 5 to a target 6 which is assumed, for the purposes of this description, to be travelling towards the aerial at a velocity sufficient to raise the frequency of the reflected signal, because of the Doppler effect, to 7,000.001 megahertz.

The echo pulse of 7,000.001 megahertz is passed through the duplexer 4 to a mixer 7. The other input to the mixer 7 receives signals of 7,010 megahertz from a local oscillator 8. This means that the output from the mixer 7 is in the form of pulses having a frequency of 9.999 megahertz. These pulses are passed to an amplifier 9.

A mixer 10 receives a continuous 7,000 megahertz signal from the transmitter 3 and the 7,010 megahertz signal from the local oscillator 8 to give an output of 10 megahertz which is fed to an amplifier 11.

The outputs of amplifiers 9 and 11 are fed to the inputs of a mixer 12 to give an output of 0.001 megahertz which is fed, via a gate 13, to the output of the circuit which may terminate for example at an audible warning device or a visual display system.

The gate 13 is opened by the pulses generated at 2 after a delay which is controlled by the delay circuit 14. This circuit 14 is provided with a control, e.g. a rotatable knob, which can readily be manipulated by the operator so as to change the length of the delay. It will be appreciated that by choosing an appropriate delay period the gate 13 is only allowed to pass output signals when they derive from a target within a particular range of distances from the aerial 5. The control for the variable delay circuit 14 preferably has calibrations or other display means associated with it so that the operator can tell, for each position of the control that the apparatus will respond to targets at some particular range of distances as indicated by the calibrations (or other display means). Thus, when the apparatus is in use, the operator continuously manipulates the control to the circuit 14 and, when a target 6 is detected, its range will be known. It is possible, as shown on FIG. 1 by the line indicated in broken lines, to take an output directly from the mixer 12. This enables the apparatus simultaneously to detect targets at any range.

A second aerial 15 is fixed, e.g. by screws, to the structure of the main transmit/receive aerial 5 so as to take a sample of the signals transmitted a short distance, e.g. one centimeter, through the atmosphere. In this particular embodiment the aerial 15 takes the form of a quarter-wave monopole. The sample taken by the aerial 15 which is a pulsed signal of 7,000 megahertz, is fed by a co-axial cable to a mixer circuit 16, the latter also receiving, as a reference signal, the output of the local oscillator 8 to which it is connected by a coupler 17. The output of the mixer 16 is therefore a pulsed output of 10 megahertz. This is connected by a line 18 to a circuit 19 the effect of which is to delay each pulse, to change its frequency, and to feed it back to the mixer 16 at least twice, at different times.

The 10 megahertz pulsed output from the mixer circuit 16 first passes to a gate 20 which is held open by the pulse produced by the generator 2. From the gate 20 the 10 megahertz pulsed output passes to a quartz delay line 21 having transducers 22 and 23 at opposite ends. The output from the delay line 21 passes to a single side band modulator 24 which acts as a frequency shifter to reduce the frequency of the delay line output by an amount which is equal to the frequency change caused by Doppler effect from a typical target. In this particular embodiment the frequency is reduced by 0.001 megahertz so that the output pulse from the frequency shifter 24 is at 9.999 megahertz. This output pulse is blocked by the gate 20 since the delay produced by the delay line 21 is greater than the duration of a pulse produced at 2. The output pulse from frequency shifter 24 therefore passes back to the mixer circuit 16. The latter is reciprocal in operation and so an output pulse of 7,000.001 megahertz is fed back to the aerial 15.

The output from the delay line 21 is also fed to an amplifier 25 which forms part of a feed back loop to the input of the delay line 21. The amplified feedback signal is also blocked by the gate 20 and passes a second time through a delay line 21 to reappear at its output after a second delay period, equal to the first. The attenuation caused by the delay line 21 and the amplification produced by the amplifier 25 are chosen so that after each passage through the delay line, the output signal is of reduced amplitude. Successive passages of the signal through the delay line cause it to decay to a level below that which can be detected by the receiver. This happens before the next pulse is produced by the transmitter. The decaying pulses transmitted by the monopole 15 are shown in FIG. 2, at B. It will be appreciated that these pulses are, envelopes of the 7,000.001 megahertz waveform.

In use of the apparatus, when no real target such as that shown at 6 is present, the operator may test the apparatus by operating a switch (not shown) which connects a high tension supply to the circuit 19 thereby bringing the latter into operation. This produces, for each transmitted pulse, a series of successive echo pulses which represent simulated targets at different distances from the aerial 5. By manipulating the control of the delay circuit 14 the operator can "locate" each of these simulated targets thereby assuring himself that the apparatus is functioning correctly and will sense targets throughout its normal range of operation. Furthermore, because of the decaying characteristics of the pulses shown at B on FIG. 2, the simulated targets at progressively greater ranges appear to produce echo signals of progressively lower amplitude. This enables the operator to ensure that the apparatus works effectively to detect the strongest and the weakest echo signals.

The illustrated embodiment of the invention is believed to be particularly effective in allowing the operator of a Doppler pulse radar system to satisfy himself, easily, quickly and with a high degree of confidence that the system is functioning correctly. It is however possible to make numerous modifications to the illustrated system. For example instead of having a single delay line 21 through which the sample signal from monopole 15 is passed repetitively, it would be possible to have a number of delay lines of different lengths. The outputs of these delay lines would be connected to the frequency shifter 24 to give exactly the same effect as the feed-back loop in the illustrated embodiment. Such a system would however be substantially more costly. Another possible modification would be to replace the simple monopole aerial 15 by a horn or to abandon the aerial 15 altogether and to connect the mixer 16 via a coupler directly to the output of the duplexer 4.

It should also be pointed out that, whilst the invention was particularly devised for use in radar systems, the same principle could be employed in acoustic, ultrasonic and optical systems.

I claim:

1. Apparatus for detecting an object of interest comprising: a transmitter for transmitting a signal to the object; a receiver for receiving a signal after reflection from the object; and a testing device for simulating objects at different ranges, the testing device including means for taking a sample of said signal and means for transmitting the sample to the receiver at at least two different times, so as to simulate at least two respective objects, whereby correct functioning of the transmitter and receiver can be tested, said testing device comprising a delay line connected to receive the sample and a feed-back connection for feeding the sample at least a second time through the delay line, said feed-back connection including an amplifier, the gain of said amplifier and the attenuation caused by said delay line being such that the amplitude of the sample after passing once through the delay line is greater than the amplitude after passing twice through said delay line.

2. Apparatus according to claim 1 wherein said delay line is an acoustic delay line.

3. Apparatus according to claim 1 or 2 wherein said transmitter is a radar transmitter and said receiver is a radar receiver.

4. Apparatus according to claim 3 wherein said transmitter includes an aerial for transmitting a radar signal and the testing device includes another aerial for sampling the said signal after transmission thereof from the first mentioned aerial.

5. Apparatus for detecting an object of interest comprising: a transmitter for transmitting a signal to the object; a receiver for receiving a signal after reflection from the object; and a testing device for simulating objects at different ranges, the testing device including means for taking a sample of said signal and means for transmitting the sample to the receiver at at least two different times, so as to simulate at least two respective objects, whereby correct functioning of the transmitter and receiver can be tested, said transmitter being a means for transmitting a signal consisting of a repeated waveform, and said receiver being a means for detecting a frequency difference, caused by Doppler effect, between the transmitted and received signals, said testing device further including means for changing the frequency of the sample.

* * * * *